Figure 1:
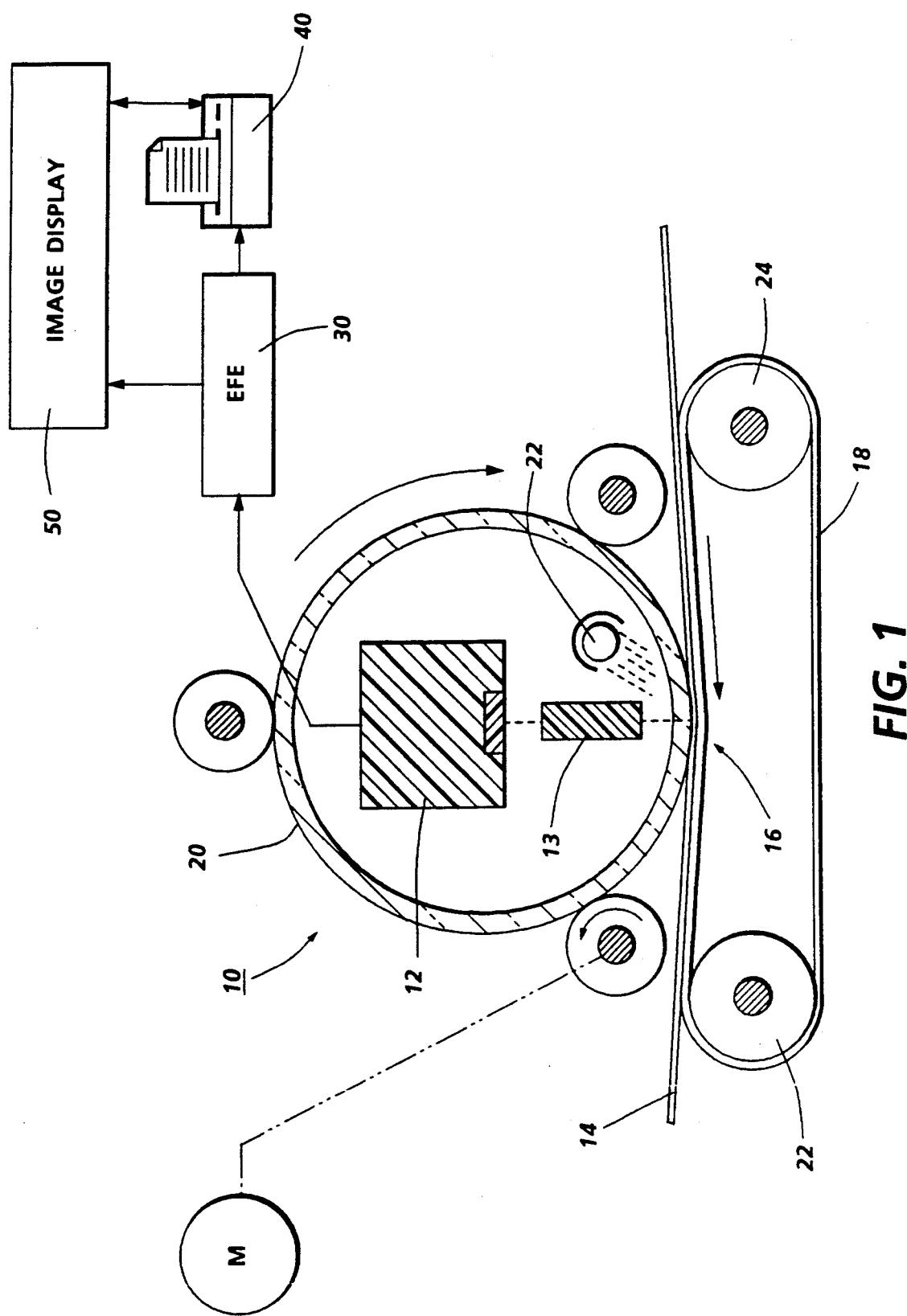

United States Patent [19]

Kanehl et al.

[11] Patent Number: 5,057,942

[45] Date of Patent: Oct. 15, 1991

[54] ELECTRONIC DOCUMENT SCANNER WITH A TRANSPARENT IMAGING & DRIVE ROLLER

[75] Inventors: Jane M. Kanehl; Steven R. Moore; Maurice F. Holmes, all of Rochester, N.Y.

[73] Assignee: Xerox Corporation, Stamford, Conn.

[21] Appl. No.: 506,643

[22] Filed: Apr. 9, 1990

[51] Int. Cl.$^5$ ............................................. H04N 1/06
[52] U.S. Cl. ................................. 358/490; 358/491; 358/496; 358/498
[58] Field of Search ............... 358/490, 491, 492, 493, 358/494, 496, 498; 355/104; 235/470, 471, 475; 382/65

[56] References Cited

U.S. PATENT DOCUMENTS

| | | |
|---|---|---|
| 3,737,575 | 6/1973 | Kominami ........................... 358/491 |
| 4,287,536 | 9/1981 | Wiggins ............................... 358/282 |
| 4,295,167 | 10/1981 | Wiggins ............................... 358/285 |
| 4,429,333 | 1/1984 | Davis et al. ......................... 358/293 |
| 4,447,830 | 5/1984 | Stoffel ................................. 358/283 |
| 4,496,984 | 1/1985 | Stoffel ................................. 358/293 |
| 4,536,077 | 8/1985 | Stoffel ..................................... 358/8 |
| 4,571,636 | 2/1986 | Itoh ...................................... 358/285 |
| 4,641,357 | 2/1987 | Satoh ..................................... 382/65 |
| 4,743,974 | 5/1988 | Lockwood ........................... 358/285 |

OTHER PUBLICATIONS

Xerox Disclosure Journal, vol. 8, No. 3, May/Jun. 1983, p. 263.
Xerox Disclosure Journal, vol. 12, No. 6, Nov./Dec. 1987, p. 299.

Primary Examiner—Leo H. Boudreau
Assistant Examiner—Barry Stellrecht

[57] ABSTRACT

An improvement in the electronic imaging of documents, of the type wherein document sheets are transported at a uniform constant velocity past an electronic imaging member with the document sheet surface to be imaged maintained at a constant imaging distance from the electronic imaging member, wherein the document is fed through a document position and velocity holding and feeding nip formed between the outside wall of a rotatable transparent cylinder and an opposing nip forming member moving therewith, preferably an idler belt, and wherein the electronic imaging member is mounted inside the transparent cylinder to image this nip area through a narrow portion of the wall of the rotatable transparent cylinder and thereby to image scan only the narrow portion of the document which is being fed through and held in the nip.

1 Claim, 1 Drawing Sheet

ELECTRONIC DOCUMENT SCANNER WITH A TRANSPARENT IMAGING & DRIVE ROLLER

The present invention relates to a low cost and simple system for moving documents at a more constant velocity and spacing past a digital electronic imaging member.

There is disclosed an improvement in the electronic imaging of documents, wherein document sheets are desired to be transported at a uniform constant velocity past an electronic imaging member with the document sheet surface to be imaged maintained at a constant imaging distance from the electronic imaging member, wherein the improvement comprises feeding the document through a document position and velocity holding and feeding nip formed between the outside wall of a rotatable tranparent cylinder and an opposing nip forming member moving therewith, preferably an idler belt, and wherein the electronic imaging member is mounted inside the transparent cylinder to image this nip area through a narrow portion of the wall of the rotatable transparent cylinder and thereby to image scan only the narrow portion of the document which is being fed through and held in the document position and velocity holding and feeding nip.

Document handling for electronic digitizing of the document image, for digital copying, printing, facsimile transmission, and/or other digital image processing, enhancement, and/or manipulation, is rapidly becoming more important and critical, as compared to conventional copying with conventional light lens optical input, or the like. This is sometimes called an EFE or "electronic front end". Moving an original or copy document sheet past a scanning slit with an attempted constant velocity for imaging with a document handler (DH) for sequential scanning or flowing image input is well known for conventional light lens optical scanning input as well as said digital EFE's or "electronic front ends".

Various document handlers specifically for EFE's are known in the art. The following patent disclosures are noted as examples. The following Xerox Corporation U.S. Pats. include those showing movement of the document before or during its scanning, (rather than the alternative of requiring a full size platen holding the document stationary and a scanning mechanism and optics for scanning the document on the platen): 4,295,167 (Especially FIG. 5) or related 4,287,536 (D/79039); 4,432,023 (D/81011); 4,536,077 (D/82114); 4,496,984; 4,471,386 (D/81132); 4,447,830 (D/80153) (The latter four also show simple straight-through document feeding); and 4,743,974 (D/86183). Also, Fuji Xerox U.S. 4,571,636 and Mead Corp. U.S. 4,429,333. Another constant velocity transport (CVT) for documents being electronically imaged is disclosed in Xerox Disclosure Journal Vol. 12 No. 6, Dec. 1987, p. 299-300.

Prior art CVT document transports are often "twin nip" CVT transports, in which the document sheet is "handed off" from one feeding nip to another feeding nip, and imaged in the space therebetween. This has well known problems in maintaining exactly equal sheet feeding speeds in the two nips, and in holding the sheet consistently flat in the imaging plane, i.e., at the same distance from the imaging member, especially curled edges.

Some of the prior art CVT EFE's illustrated above use at least one stationary (rather than moving) document holddown member surface during imaging, which undesirably requires the moving document to be pushed and/or dragged across that stationary holddown member surface overcoming friction compounded by the normal force of the holddown member pressing against the document.

Some of these above references also illustrate how duplex document (both sides) imaging can be accomplished by dual, opposite side, scanners or by turning over and returning the document to the same scanner. See, e.g., U.S. Pat. No. 4,743,974 (D/86183) and art cited therein. The present system may be used in either manner for duplex imaging, if desired.

Electronic image scanning may be done bidirectional, as is known per se for example from Eastman Kodak U.S. Pat. No. 4,150,873 issued Apr. 24, 1979 to G. Dali and Xerox Corporation U.S. Pat. No. 4,205,350, for moving scanners. Here, bidirectional imaging may be done very simply, if desired, by reversing the direction of rotation of the imaging roller. However, here there is no need to do bidirectional imaging, since there is no need for document exchange time delays or interdocument pitch skips. Plural document sheets can be imaged in closely spaced direct sequence here.

Various electronic buffer and page collation systems may be connected to or made a part of an EFE, as discussed in above-cited references and IBM Corp. U.S. Pat. Nos. 4,099,254 or 4,213,694; Eastman Kodak Canadian 1,086,231 or UK 1 531 401; the Xerox Corporation "1200" and "9700" and other printers, etc..

In view of the above and other prior art disclosures, including other art cited therein, it will be appreciated that details of the electronic imaging member per se are well known in the art and commercially available and need not be described herein. One example of a full width scanning array cited in the above-cited patents is U.S. Pat. No. 4,604,161 to Araghi, et al.

Other art of background interest includes U.S. Pat. Nos 3,529,168 and 4,113,105 on electronic sensors associated with sheet feeding nips.

Rotatable transparent glass cylinders per se are known in a few other, different, applications, such as containing a flood illumination source 41 for the back of a special transport belt 12 for a copy sheet 18 in a image transfer area for a previously formed and developed image in U.S. Pat. No. 4,014,605, FIG. 2.

A specific feature of the specific embodiment(s) disclosed herein is to provide a document scanning apparatus for sequentially scanning areas of a moving document with a stationary electronic document imaging member to electronically image the document, the improvement comprising; an axially rotatably mounted rigid and transparent wall hollow cylinder, said stationary electronic document imaging member being mounted inside of said transparent hollow cylinder at a fixed distance from and imaging through a minor imaging area of the wall of said transparent cylinder, drive means for rotating said transparent hollow cylinder at a constant rotational velocity about its axis, and nip forming means for holding a document to be imaged firmly against the outer surface of said rotating transparent hollow cylinder wall within said minor imaging area so that the document is held with non-slip engagement directly against that surface and fed thereon at a uniform constant velocity past said electronic imaging member so that the document sheet surface to be imaged is maintained at a constant imaging distance from the electronic imaging member during its imaging, said nip forming means being adapted to move at the same speed as said outer surface of said rotating transparent hollow cylinder wall within said minor imaging area.

Further specific features provided by the system disclosed herein, individually or in combination, include those wherein said nip forming means comprises an idler belt partially wrapped in short arc around said outer surface of said rotating transparent hollow cylinder wall to form a document holding nip approximately coextensive with said imaging area, said idler belt being adapted to be driven by said rotation of said transparent hollow cylinder, and/or wherein said nip forming means comprises a belt entrained around idler pulleys spaced at opposite sides of said rotating transparent hollow cylinder and positioned so that one flight of said belt is partially wrapped in short arc around said outer surface of said rotating transparent hollow cylinder wall to form a document holding nip therewith.

Further disclosed features include a constant velocity document scanning apparatus for electronically scanning documents with a full width electronic document scanning array means by feeding the documents past the electronic document scanning array means at a constant speed for image scanning, comprising, a rotatable transparent document drive roll; an idler belt entrained around a pair of spaced rollers to form a nip with the outside of said transparent document drive roll; said electronic document scanning array means being positioned inside of said transparent document drive roll to image said nip through said transparent document drive roll, for digitizing information on a document being transported by said transparent document drive roll through said nip, and/or wherein said transparent document drive roll is centerless rotatably mounted to allow open-ended central mounting therethrough of said electronic document scanning array means.

Another disclosed feature is a process in a document scanning system for sequentially scanning areas of a moving document with a stationary electronic document imaging member to electronically image the document, the improvement comprising the steps of; rotating a rigid transparent wall hollow cylinder at a constant rotational velocity about its axis, within which transparent hollow cylinder the stationary electronic document imaging member is mounted to image through a minor imaging area of the wall of the rotatable transparent cylinder, feeding the document into engagement with this minor imaging area of the outer surface of the rotating transparent hollow cylinder being imaged by the document imaging member, holding the document firmly against this minor imaging area of the outer surface of the rotating transparent hollow cylinder with a correspondingly moving nip forming member so that the document is held with non-slip engagement directly against that surface and fed thereon at a uniform constant velocity past the electronic imaging member in this imaging area and with the document sheet surface to be imaged being maintained at a constant imaging distance from the electronic imaging member in this imaging area; and/or wherein said holding of the document firmly against this minor imaging area of the outer surface of the rotating transparent hollow cylinder is accomplished by an idler belt providing said correspondingly moving nip forming member by one flight of said belt being partially wrapped in short arc around the outer surface of the rotating transparent hollow cylinder wall to form a document holding nip therewith.

All references cited in this specification, and their references, are incorporated by reference herein where appropriate for appropriate teachings of additional or alternative details, features, and/or technical background.

Various of the above-mentioned and further features and advantages will be apparent from the specific apparatus and its operation described in the example below, as well as the claims. Thus the present invention will be better understood from this description of an embodiment thereof, including the drawing figures (approximately to scale) wherein:

FIG. 1, the Figure, is a schematic cross-sectional side view of one embodiment of the subject constant velocity transport document handler for an electronic document imaging system.

Describing in further detail the exemplary embodiment with reference to the Figure, there is show a constant velocity transport document handler for an electronic front end [CVT DH EFE] 10 by way of one example of the invention. It provides a low cost and simple system for positively moving documents sheets at a more constant velocity past a digital electronic imaging member 12 within the area of document imaging, while also maintaining each document 14 surface at a more constant image or focal length spacing from the imaging member 12 within the area of document imaging.

Here the electronic imaging member 12 is a conventional full width imaging bar or scan head array, preferably with an integral conventional lens strip 13 such as a well known Selfoc TM multi-element lens, or fiber optics array, as in U.S. Pat. No. 3,977,777, for example. See also the above-cited EFE prior art.

The document sheet 14 surface to be imaged (here the upper sheet surface) is maintained at a constant imaging distance from the electronic imaging member 12 here by feeding the document through a document position and velocity holding nip 16, which nip 16 provides the document imaging area. Here, this is a combined feeding and imaging nip 16 is formed between a moving sheet transport belt 18 and the corresponding moving outside wall of a rotatable cylinder 20. The cylinder 20 is a transparent clear glass or hard plastic hollow tube of uniform wall thickness (preferably varying by less than 0.1 mm). The belt 18 forms a tensioned partial but slight wrap (a short arc length) around a minor area of the transparent cylinder 20, to form the nip 16 and to insure that a sheet 14 is firmly held therebetween directly against the glass surface, and so that there is a non-slip constant speed drive of the sheet 14 in that same nip 16 area. The lead and trail edges of the sheet are held firmly in the imaging plane position in the nip 16 even if they were curled, as often happens with paper sheets. Additionally, the outer surface of the transparent cylinder 20 may have a friction increasing coating, and/or a static elimination coating, if desired. The illustrated (known per se) 3 roller "centerless" end mounting and drive of cylinder 20 is merely exemplary of a desired "open ended" rotary mounting. Annular ring end bearings or the like could be used instead.

The belt 18 itself may be a simple single wide frictional belt, as is well known in the copier document handling art for over-platen document transports. A smooth surfaced rubber or plastic or reinforced belt may be used. Alternatively a finely apertured vacuum belt, as is also well known in conventional copier document transports, may be used, but is not required. The belt 18 and its position relative to the transparent cylinder 20 may be provided by an endless loop wrap of the belt around supporting rollers 22 and 24 spaced at opposite sides of the nip area 16 to hold the upper belt flight slightly above the nip 16 level. Preferably, the belt 18 may also be colored or retroreflective or otherwise optically distinct from a normal paper document so that the document area and its edges can be easily electronically distinguished from the belt by the output circuitry 30 of the electronic imaging member 12.

An alternative to the belt 18 would be a large diameter highly elastomeric idler roller deformably engaging the cylinder 20. However, that would be less preferable, because of inherent surface velocity variations as the roller radius varied with its deformance.

Preferably the rollers 22 and 24 are idlers so that the belt 18 is an idler belt driven only by the rotation of the transparent cylinder 20, and thus always being at the same velocity in the nip 16 as the surface of the cylinder 20. Since the cylinder 20 has a rigid radius, its outer surface can be driven at a constant speed, unlike an elastomeric belt or roller. The ends of the hollow cylinder 20 are preferably mounted in a conventional or suitable "centerless" or openended rotational bearing mounting and driven by a constant speed motor "M" by any suitable direct or other drive, as noted above. This allows fixed end mountings of the imaging member 12 without interference.

The electronic imaging member strip or bar 12 is mounted inside the hollow transparent cylinder 20, extending axially along the axis of the cylinder, which is transverse the paper path. The electronic imaging member 12 is aimed to image the nip area 16 through the narrow portion of the wall of the cylinder 20 which is in the nip 16. Thereby, the imaging member 12 image scans only the narrow portion of the document which is being fed through and held sandwiched in the nip 16 against the cylinder 20 by the belt 18. That is, the imaging occurs only in the document position and velocity holding and feeding nip 16, through the cylinder 20 wall in that limited area 16. The area of the sheet 14 being imaged is the same area of the sheet 14 being positively driven at a constant speed, and also positively held against a solid imaging surface which the cylinder 20 provides at a fixed constant distance from the electronic imaging member 12, for consistent, uniform, imaging of the entire document 14 even though it is being sequentially partially scanned in stripwise.

A document illuminating light source 22 is also preferably located inside the cylinder 20 aiming light at the nip 16 through the cylinder 20 to be reflected from the document surface back through the cylinder 20 into the electronic imaging member 12. A cooling air blower for blowing air through one of the open ends of the cylinder 20 may be provided, if desired, for removing heat from this lamp 22. However, some silicon electronic imaging scanners actually operate better warmer.

An engaging cleaning web, brush or other means may be provided for keeping the outer surface of the cylinder 20 cleaned automatically, if desired.

Conventionally, the electronic output of the electronic imaging member 12 may be fed to a conventional EFE processor and/or buffer 30, and then may used to drive an electronic copier or printer 40 in a known manner, e.g. an electrostatographic or ion beam printer, a xerographic or laser printer, an ink jet or thermal printer, or the like. Alternatively or additionally the scanned in page images of the sequentially fed documents 14 may be fed to and processed by an image terminal or display 50. The scanned in and/or processed image may be four color, two color, or back and white, and in various contrast or gray scale levels, as is well known.

While the embodiment disclosed herein is preferred, it will be appreciated from this teaching that various alternatives, modifications, variations or improvements therein may be made by those skilled in the art, which are intended to be encompassed by the following claims:

What is claimed is:

1. An electronic document imaging scanning apparatus with a fixed, stationary, full document width, electronic document scanning bar for electronically scanning documents by feeding a documents past said fixed electronic document scanning bar at a controlled velocity while imaging only a minor transverse scanning strip area of the document at a time with said fixed electronic document scanning bar, further comprising:
   a rotatable transparent thin walled hollow cylindrical document drive roll;
   drive means for accurately rotating said transparent hollow cylindrical document drive roll at a controlled rotational velocity about the axis of the cylinder during said scanning,
   document transport belt means for transporting a document to be imaged in a substantially planar document transport path to and from a very minor area of the rotating outer surface of said cylindrical document drive roll during said scanning to provide rapid directly sequential imaging,
   said document transport belt means forming a small document holding nip with only said very minor area of the outer surface of said cylindrical document drive roll,
   said document transport belt means comprising an idler belt entrained around idler pulleys mounted at opposite sides of said rotating transparent cylindrical drive roller, said idler pulleys being substantially spaced from said roller, and positioned so that one flight of said idler belt is substantially tangential to said outer surface of said cylindrical document drive roll to form said small document holding nip therewith,
   said small document holding nip between said idler belt flight and said very minor area of the outer surface of said cylindrical document drive roll being approximately coextensive in area with said minor transverse scanning strip area of said electronic document scanning bar,
   said idler belt flight being driven by said rotation of said cylindrical document drive roll, at the same surface velocity,
   and said electronic document scanning bar being non-rotatably independently stationarily mounted inside of said transparent cylindrical document drive roll to image the document through said thin wall of said transparent document drive roll in said minor area thereof, by scanning and digitizing information on the document being transported by said transparent document drive roll through said small document holding nip at said controlled rotational velocity while said document transport belt means transports the document in said substantially planar document transport path.

* * * * *